(12) United States Patent
Iba et al.

(10) Patent No.: US 8,379,328 B2
(45) Date of Patent: Feb. 19, 2013

(54) IMAGING LENS AND IMAGING DEVICE USING THE LENS

(75) Inventors: Takumi Iba, Kyoto (JP); Masatoshi Yamashita, Osaka (JP)

(73) Assignee: Panasonic Corporation, Osaka (JP)

( * ) Notice: Subject to any disclaimer, the term of this patent is extended or adjusted under 35 U.S.C. 154(b) by 106 days.

(21) Appl. No.: 12/867,609

(22) PCT Filed: Jul. 1, 2009

(86) PCT No.: PCT/JP2009/003050
§ 371 (c)(1),
(2), (4) Date: Aug. 13, 2010

(87) PCT Pub. No.: WO2010/026689
PCT Pub. Date: Mar. 11, 2010

(65) Prior Publication Data
US 2010/0328518 A1 Dec. 30, 2010

(30) Foreign Application Priority Data
Sep. 3, 2008 (JP) .................................. 2008-226333

(51) Int. Cl.
G02B 3/02 (2006.01)
G02B 27/00 (2006.01)
G02B 9/12 (2006.01)
H04N 5/225 (2006.01)

(52) U.S. Cl. ......... 359/716; 359/578; 359/791; 348/340

(58) Field of Classification Search .................. 348/335, 348/340; 359/578, 716, 791
See application file for complete search history.

(56) References Cited

U.S. PATENT DOCUMENTS
7,800,842 B2 * 9/2010 Iba et al. ....................... 359/785
(Continued)

FOREIGN PATENT DOCUMENTS
JP 2004-317743 11/2004
JP 2005-301048 10/2005
(Continued)

OTHER PUBLICATIONS
KIPO (English Translation) Application As Filed 10_2012_7019433 (Aug. 31, 2010).*
(Continued)

*Primary Examiner* — David N Spector
(74) *Attorney, Agent, or Firm* — Hamre, Schumann, Mueller & Larson, P.C.

(57) ABSTRACT

The present invention provides an imaging lens composed of three lenses that can be made compact (downsized, thinned), allows a reduction in cost and can be made compatible with a high pixel imaging element having a megapixel or more incorporated in a small mobile product such as a mobile phone. The imaging lens 6 includes, in order from the object side to the image surface side: an aperture stop 4; a first lens 1 having positive refractive power whose lens surface facing the image surface side is provided with a diffractive optical element; a second lens 2 composed of a meniscus lens having positive refractive power whose lens surface facing the image surface side is convex; a third lens 3 having negative refractive power. When f denotes the focal length of the entire optical system, f1 denotes the focal length of the first lens 1, f2 denotes the focal length of the second lens 2, f3 denotes the focal length of the third lens 3 and $\phi_{DOE}$ denotes refractive power of the diffractive optical element, conditional expressions (1) to (4) are satisfied:

$0.9 < f1/f < 1.3$     (1)

$0.7 < f2/f < 1.1$     (2)

$-0.8 < f3/f < -0.6$     (3)

$-0.3 < f \phi_{DOE} < 0.5$     (4).

3 Claims, 6 Drawing Sheets

U.S. PATENT DOCUMENTS

| | | |
|---|---|---|
| 2006/0092529 A1 | 5/2006 | Zeng et al. |
| 2007/0064316 A1 | 3/2007 | Noda |
| 2012/0019706 A1* | 1/2012 | Yamashita et al. ............ 348/340 |
| 2012/0224080 A1* | 9/2012 | Iba et al. .................... 348/222.1 |
| 2012/0229695 A1* | 9/2012 | Iba et al. ....................... 348/360 |

FOREIGN PATENT DOCUMENTS

| | | |
|---|---|---|
| JP | 2006-126792 | 5/2006 |
| JP | 2007-86485 | 4/2007 |
| JP | 2007-127960 | 5/2007 |

OTHER PUBLICATIONS

KIPO (English Translation) Reasons for Refusal for 10_2012_7019433 (Apr. 18, 2012).*

KIPO (English Translation) Written Reply 10_2012_7019433 (May 6, 2012).*

KIPO (English Translation) Amendments for 10_2012_7019433 (May 6, 2012).*

International Search Report of PCT/JP2009/003050, dated Aug. 4, 2009.

* cited by examiner

IMAGING LENS AND IMAGING DEVICE USING THE LENS

TECHNICAL FIELD

The present invention relates to an imaging lens suitable for small mobile products, such as a mobile phone, equipped with an imaging device and also to an imaging device using the imaging lens.

BACKGROUND ART

In recent years, small mobile products, such as a mobile phone, equipped with an imaging device (camera module) have become widely popular, and taking pictures instantly with the small mobile products has become a common practice. And as an imaging lens for small imaging devices incorporated in the small mobile products, an imaging lens composed of three lenses has been proposed, because the performance of this imaging lens can be enhanced in comparison with imaging lenses composed of one or two lenses. The imaging lens composed of three lenses includes, in order from the object side to the image surface side, a first lens, a second lens and a third lens (see Patent document 1, for example).

The imaging lens described in Patent document 1 includes, in order from the object side to the image surface side, a first lens having positive refractive power, a second lens composed of a meniscus lens having negative refractive power whose lens surface facing the object side is concave and a third lens having positive refractive power. Here, the reason why a lens having negative refractive power is used for the second lens is to correct favorably the chromatic aberration in particular. Further, in the imaging lens proposed in Patent document 1, a reduction in cost is achieved by using plastic lenses for all of the first to third lenses.

PRIOR ART DOCUMENT

Patent Document

Patent document 1: JP 2004-317743 A

SUMMARY OF INVENTION

Problem to be Solved by the Invention

However, with regard to the imaging lens described in Patent document 1, because a lens having negative refractive power is used for the second lens, it is difficult to achieve a further reduction in the optical total length as has been required over recent years.

Further, with regard to the imaging lens described in Patent document 1, the first lens or the second lens has large power (refractive power) relative to the focal length of the entire optical system, so that the impact of production errors, such as decentering of each component lens, on aberration increases. As a result, the imaging lens described in Patent document 1 may not be made compatible with a high pixel imaging element having a megapixel or more.

With the foregoing in mind, it is an object of the present invention to provide an imaging lens composed of three lenses that can be made compact (downsized, thinned), allows a reduction in cost and can be made compatible with a high pixel imaging element having a megapixel or more incorporated in a small mobile product such as a mobile phone and to provide an imaging device using the imaging lens.

Means for Solving Problem

In order to solve the aforementioned problem, the imaging lens of the present invention includes, in order from an object side to an image surface side: a first lens having positive refractive power whose lens surface facing the image surface side is provided with a diffractive optical element; a second lens composed of a meniscus lens having positive refractive power whose lens surface facing the image surface side is convex; and a third lens having negative refractive power. When f denotes the focal length of the entire optical system, f1 denotes the focal length of the first lens, f2 denotes the focal length of the second lens, f3 denotes the focal length of the third lens and $\phi_{DOE}$ denotes refractive power of the diffractive optical element, conditional expressions (1) to (4) are satisfied.

$$0.9 < f1/f < 1.3 \tag{1}$$

$$0.7 < f2/f < 1.1 \tag{2}$$

$$-0.8 < f3/f < -0.6 \tag{3}$$

$$0.3 < f \cdot \phi_{DOE} < 0.5 \tag{4}$$

The conditional expression (1) relates to a balance of refractive power between the first lens and the entire optical system. When f1/f becomes 0.9 or less or 1.3 or more, it is difficult to correct spherical aberration and astigmatism favorably while keeping the optical total length small.

The conditional expression (2) relates to a balance of refractive power between the second lens and the entire optical system. When f2/f becomes 0.7 or less or 1.1 or more, it is difficult to correct spherical aberration and astigmatism favorably while keeping the optical total length small.

The conditional expression (3) relates to a balance of refractive power between the third lens and the entire optical system. When f3/f becomes −0.8 or less or −0.6 or more, it is difficult to correct spherical aberration and astigmatism favorably while keeping the optical total length small.

The conditional expression (4) relates to the refractive power of the diffractive optical element formed on the first lens. When $f \cdot \phi_{DOE}$ becomes −0.3 or less or 0.5 or more, it is difficult to maintain a favorable balance between the optical total length and ray aberration and chromatic aberration.

For these reasons, according to the configuration of the imaging lens of the present invention, it is possible to provide a high-performance imaging lens composed of three lenses that can be made compact (downsized, thinned), allows favorable correction of a variety of aberrations and can be made compatible with a high pixel imaging element having a megapixel or more incorporated in a small mobile product such as a mobile phone. Further, according to the configuration of the imaging lens of the present invention, the imaging lens can be made compatible with a high pixel imaging element having a megapixel or more regardless of the material of each lens. Thus, it is also possible to achieve a reduction in cost by using plastic for the lens material.

In the configuration of the imaging lens of the present invention, the first to third lenses are preferably all plastic lenses. According to this preferred example, molding of the first to third lenses, including providing the lens with the diffractive optical element, can be carried out readily in addition to gaining a material cost advantage, and by extension a production cost advantage.

Further, the imaging device of the present invention includes an imaging element for converting an optical signal corresponding to an object to an image signal and outputting the image signal; and an imaging lens for forming an image of the object onto an imaging surface of the imaging element. The imaging lens of the present invention is used as the imaging lens.

According to the configuration of the imaging device of the present invention, by using the imaging lens of the present invention as its imaging lens, it is possible to provide a compact and high-performance imaging device, and by extension a compact and high-performance mobile product, such as a mobile phone, equipped with the imaging device.

EFFECTS OF THE INVENTION

As described above, according to the present invention, it is possible to provide an imaging lens composed of three lenses that can be made compact (downsized, thinned), allows a reduction in cost and can be made compatible with a high pixel imaging element having a megapixel or more incorporated in a small mobile product such as a mobile phone and to provide an imaging device using the imaging lens.

BRIEF DESCRIPTION OF DRAWINGS

FIG. 2(a) is a spherical aberration (longitudinal chromatic aberration) graph, FIG. 2(b) is an astigmatism graph and FIG. 2(c) is a distortion graph.

FIG. 4(a) is a spherical aberration (longitudinal chromatic aberration) graph, FIG. 4(b) is an astigmatism graph and FIG. 4(c) is a distortion graph.

FIG. 6(a) is a spherical aberration (longitudinal chromatic aberration) graph, FIG. 6(b) is an astigmatism graph and FIG. 6(c) is a distortion graph.

DESCRIPTION OF THE INVENTION

Hereinafter, the present invention will be described in more detail by way of embodiments.

Embodiment 1

Figure 1:
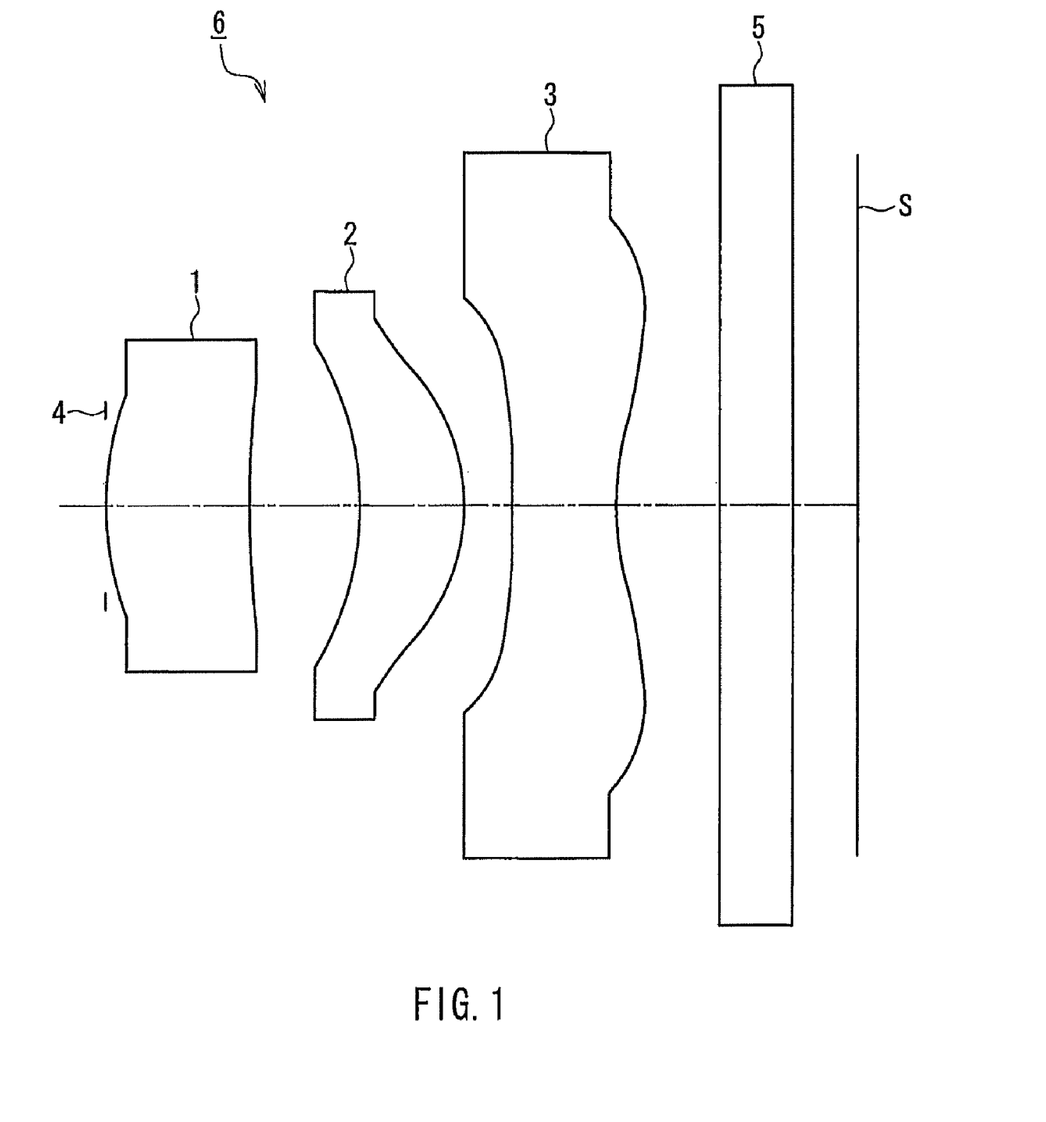
FIG. 1 is a layout showing a configuration of an imaging lens according to Embodiment 1 of the present invention.

FIG. 1 is a layout showing a configuration of an imaging lens according to Embodiment 1 of the present invention.

As shown in FIG. 1, an imaging lens 6 of the present embodiment includes, in order from the object side (left side of FIG. 1) to the image surface side (right side of FIG. 1): an aperture stop 4; a first lens 1 having positive refractive power whose lens surface facing the image surface side is provided with a diffractive optical element; a second lens 2 composed of a meniscus lens having positive refractive power whose lens surface facing the image surface side is convex; and a third lens 3 having negative refractive power. The imaging lens 6 is an imaging single focus lens for forming optical images (forming an object image) onto the imaging surface S of an imaging element (e.g., CCD) and the imaging element converts an optical signal corresponding to the object to an image signal and outputs the image signal. An imaging device is configured using the imaging element and the imaging lens 6.

Here, the shape of the lens surface on which the diffractive optical element is formed (hereinafter referred to as the "diffractive optical element surface") is given, for example, by Formula 1 (the same holds true for Embodiments 2 and 3 described later).

$$\phi(\rho) = (2\pi/\lambda_0)(C2\rho^2 + C4\rho^4) \quad \text{[Formula 1]}$$

$$Y = \rho$$

Where, in Formula 1, $\phi(\rho)$ denotes a phase function, Y denotes the height from the optical axis, Cn denotes an nth-order phase coefficient, and $\lambda_0$ denotes a design wavelength. Meanwhile, X is determined by shape converting $\phi(\rho)$ at an M-th diffractive order.

The first lens 1 is composed of a meniscus lens whose lens surface facing the object side is convex.

The third lens 3 is composed of a biconcave lens.

Each lens surface of the first lens 1 to the third lens 3 can be made aspherical as needed, and the aspherical shape of each lens surface is given by Formula 2 (the same holds true for Embodiments 2 and 3 described later).

$$X = \frac{\frac{Y^2}{R_0}}{1 + \sqrt{1 - (\kappa + 1)\left(\frac{Y}{R_0}\right)^2}} + A4Y^4 + A6Y^6 + A8Y^8 + A10Y^{10} + \ldots \quad \text{[Formula 2]}$$

Where, in Formula 2, Y denotes the height from the optical axis, X denotes the distance from the tangent plane to the vertex of the aspherical surface of the aspherical shape at height Y from the optical axis, $R_0$ denotes the radius of curvature of the vertex of the aspherical surface, x denotes a conic constant, and A4, A6, A8, A10 ... denote fourth-, sixth-, eighth-, tenth-, ... order aspherical coefficients, respectively.

The imaging lens 6 of the present embodiment is configured to satisfy conditional expressions (1) to (4).

$$0.9 < f1/f < 1.3 \tag{1}$$

$$0.7 < f2/f < 1.1 \tag{2}$$

$$-0.8 < f3/f < -0.6 \tag{3}$$

$$-0.3 < f \cdot \phi_{DOE} < 0.5 \tag{4}$$

where f denotes the focal length of the entire optical system, f1 denotes the focal length of the first lens 1, f2 denotes the focal length of the second lens 2, f3 denotes the focal length of the third lens 3 and $\phi_{DOE}$ denotes the refractive power of the diffractive optical element.

The conditional expression (1) relates to a balance of refractive power between the first lens 1 and the entire optical system. When f1/f becomes 0.9 or less or 1.3 or more, it is difficult to correct spherical aberration and astigmatism favorably while keeping the optical total length small.

The conditional expression (2) relates to a balance of refractive power between the second lens 2 and the entire optical system. When f2/f becomes 0.7 or less or 1.1 or more, it is difficult to correct spherical aberration and astigmatism favorably while keeping the optical total length small.

The conditional expression (3) relates to a balance of refractive power between the third lens 3 and the entire optical system. When f3/f becomes −0.8 or less or −0.6 or more, it is difficult to correct spherical aberration and astigmatism favorably while keeping the optical total length small.

The conditional expression (4) relates to the refractive power of the diffractive optical element formed on the first lens 1. When $f \cdot \phi_{DOE}$ becomes −0.3 or less or 0.5 or more, it is difficult to maintain a favorable balance between the optical total length and ray aberration and chromatic aberration.

For these reasons, according to the configuration of the imaging lens 6 of the present embodiment, it is possible to provide a high-performance imaging lens composed of three lenses that can be made compact (downsized, thinned), allows favorable correction of a variety of aberrations and can be made compatible with a high pixel imaging element having a megapixel or more incorporated in a small mobile product, such as a mobile phone. And according to the configuration of the imaging device using the imaging lens 6 of the present embodiment, it is possible to provide a compact and high-performance imaging device, and by extension a compact and high-performance mobile product, such as a mobile phone, equipped with the imaging device.

A transparent parallel plate 5 is disposed between the third lens 3 and the imaging surface S of the imaging element. Here, the parallel plate 5 is a plate that is equivalent to an optical low-pass filter, an IR-cut filter and a faceplate (glass cover) of the imaging element.

Respective surfaces from the lens surface of the first lens 1 facing the object side to the surface of the parallel plate 5 facing the image surface side (hereinafter also referred to as "optical surfaces") will be referred to as, in order from the object side, a "first surface", a "second surface", a "third surface" . . . and an "eighth surface" (the same folds true for Embodiments 2 and 3 described later).

In the imaging lens 6 of the present embodiment, the first lens 1 to the third lens 3 are preferably all plastic lenses. When plastic molded products are used for the first lens 1 to the third lens 3, molding of the first lens 1 to the third lens 3, including providing the lenses with an aspheric shape and the diffractive optical element, can be carried out readily in addition to gaining a material cost advantage, and by extension a production cost advantage.

Existing materials such as polymethyl methacrylate (PMMA), polycarbonate resin (PC), cyclic olefin polymer, styrene-based resin, polystyrene resin (PS) and low moisture absorbing acrylic resin can be used as the material of the plastic lenses.

Example 1

Hereinafter, the imaging lens of the present embodiment will be described in more detail by way of specific examples.

Table 1 provides a specific numerical example of the imaging lens in this example.

TABLE 1

| Surface number | r (mm) | d (mm) | n | ν |
|---|---|---|---|---|
| Aperture stop | ∞ | 0.00 | — | — |
| First surface | 1.981 | 0.965 | 1.5247 | 56.38 |
| Second surface* | 13.157 | 0.752 | — | — |
| Third surface | −1.849 | 0.711 | 1.5247 | 56.38 |
| Fourth surface | −0.990 | 0.320 | — | — |

TABLE 1-continued

| Surface number | r (mm) | d (mm) | n | ν |
|---|---|---|---|---|
| Fifth surface | −46.819 | 0.694 | 1.5247 | 56.38 |
| Sixth surface | 1.474 | 0.700 | — | — |
| Seventh surface | ∞ | 0.500 | 1.5168 | 64.2 |
| Eighth surface | ∞ | 0.05 | — | — |
| Image surface | ∞ | — | — | — |

In Table 1, r (mm) denotes the radius of curvature of each optical surface, d (mm) denotes the thickness or distance between each pairs of adjacent surfaces of the first lens 1 to the third lens 3 and the parallel plate 5 on the optical axis, n denotes the refractive index of each of the first lens 1 to the third lens 3 and the parallel plate 5 at the d line (587.5600 nm), and ν denotes the Abbe number of each of the first lens 1 to the third lens 3 and the parallel plate 5 at the d line (the same holds true for Examples 2 and 3 described later). Note that the imaging lens 6 shown in FIG. 1 is configured on the basis of the data provided in Table 1.

Further, Tables 2A and 2B provide aspherical coefficients (including conic constant) of the imaging lens in this example. In Tables 2A and 2B, it is assumed that "E+00", "E−02" and the like represent "$10^{+00}$", "$10^{-02}$" and the like, respectively (the same holds true for Table 3 and Examples 2 and 3 described later).

TABLE 2A

| | κ | A4 | A6 |
|---|---|---|---|
| First surface | −1.596549E+00 | 2.276526E−02 | 1.902535E−04 |
| Second surface* | 0.000000E+00 | 1.258977E−02 | −7.626281E−03 |
| Third surface | −8.704164E+00 | −1.952750E−01 | 1.020787E−01 |
| Fourth surface | −2.829026E+00 | −1.568808E−01 | 7.154366E−02 |
| Fifth surface | 0.000000E+00 | −1.081921E−01 | 3.143199E−02 |
| Sixth surface | −7.351840E+00 | −7.101780E−02 | 1.900543E−02 |

TABLE 2B

| | A8 | A10 | A12 |
|---|---|---|---|
| First surface | −4.191092E−02 | 2.200055E−01 | −3.650511E−01 |
| Second surface* | −9.704931E−03 | 2.384456E−02 | −1.861119E−02 |
| Third surface | −5.910184E−02 | 5.954043E−02 | −1.482976E−02 |
| Fourth surface | −2.437521E−02 | 7.678883E−03 | 4.756348E−03 |
| Fifth surface | −1.803266E−02 | 9.638002E−03 | −4.292510E−03 |
| Sixth surface | −5.078307E−03 | 4.103567E−04 | −5.007856E−06 |

As shown in Tables 2A and 2B, in the imaging lens 6 of this example, the lens surfaces of the first lens 1 to the third lens 3 are all aspherical. It should be noted, however, that the imaging lens 6 is not necessarily limited to this configuration.

Further, in Tables 1, 2A and 2B, the surface marked with an asterisk (second surface: the lens surface of the first lens 1 facing the image surface side) is a diffractive optical element surface. Table 3 provides a specific numerical example of the diffractive optical element surface.

TABLE 3

| Design wavelength | 546.07 nm |
|---|---|
| Diffraction order | 1 |
| C2 | −1.296980E−02 |
| C4 | 1.381769E−03 |

Further, Table 4 provides the F number Fno, the focal length f (mm) of the entire optical system, the optical total length measured in terms of air TL (mm), the maximum image height Y and the values of the respective conditional expressions (1) to (4) in the imaging lens 6 in this example.

TABLE 4

| Fno | 3.2 |
|---|---|
| f (mm) | 3.56 |
| TL (measured in terms of air) (mm) | 4.69 |
| Y' | 2.24 |
| Conditional expression (1) f1/f | 1.1 |
| Conditional expression (2) f2/f | 0.88 |
| Conditional expression (3) f3/f | −0.76 |
| Conditional expression (4) f · $\phi_{DOE}$ | 0.09 |

Figure 2:
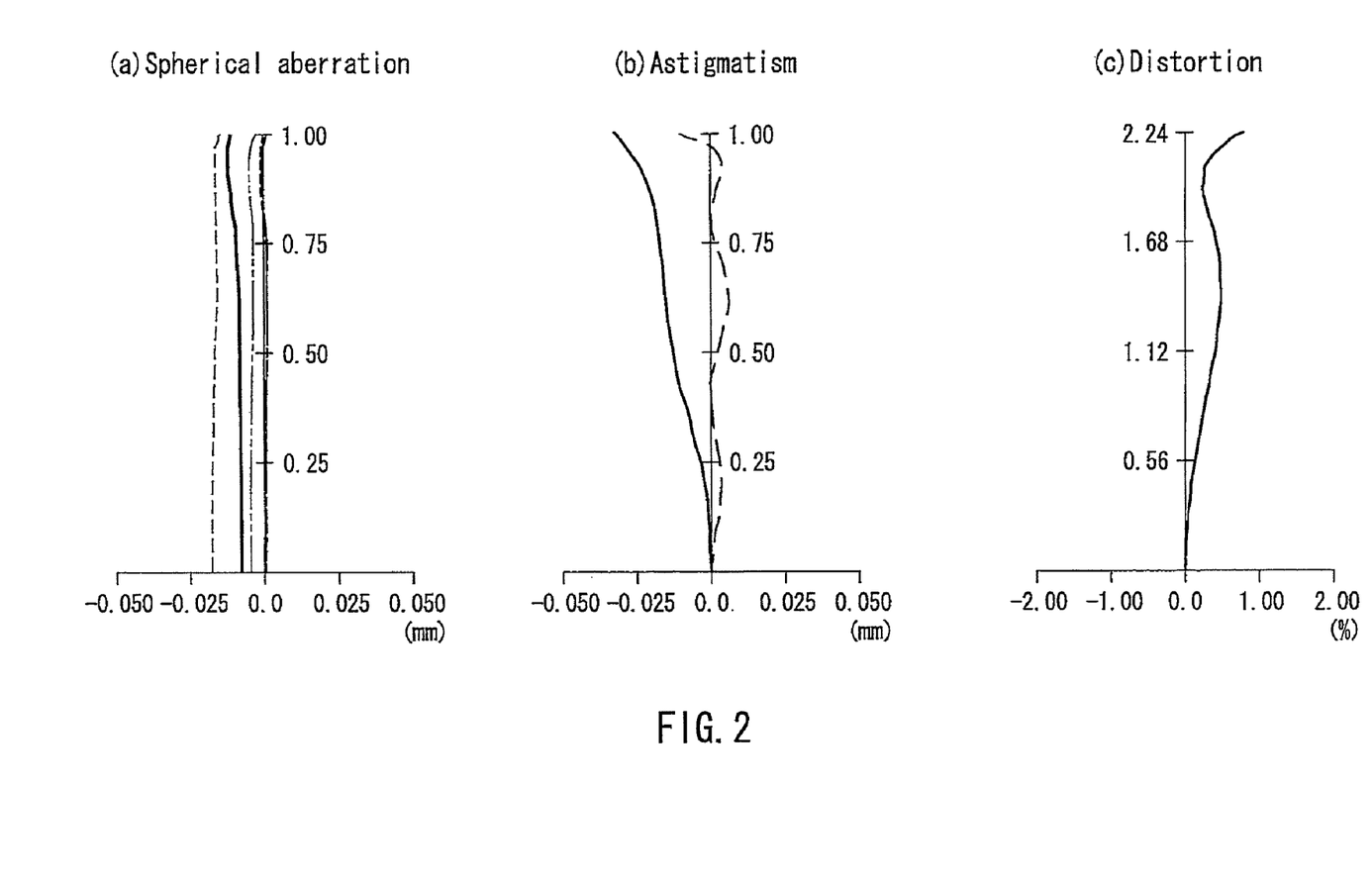
FIG. 2 shows aberration graphs of an imaging lens in Example 1 of the present invention.

FIG. 2 shows aberration graphs of the imaging lens in this example. FIG. 2(a) is a spherical aberration graph. A solid line indicates values at the g line (435.8300 nm), a short dashed line indicates values at the F line (486.1300 nm), an alternate long and short dashed line indicates values at the e line (546.0700 nm), an alternate long and two short dashed line indicates values at the d line (587.5600 nm) and a long dashed line indicates values at the C line (656.2700 nm). FIG. 2(b) is an astigmatism graph and a solid line indicates a sagittal field curvature and a dashed line indicates a meridional field curvature. FIG. 2(c) is a distortion graph. A longitudinal chromatic aberration graph is the same as the spherical aberration graph of FIG. 2(a).

As can be seen from the aberration graphs shown in FIG. 2, the imaging lens 6 of this example allows favorable correction of a variety of aberrations, meaning that it is compatible with a high pixel imaging element having a megapixel or more. Additionally, in view of the results provided in Table 4, it is evident that a high-performance imaging lens composed of three lens, which can be made compact (downsized, thinned), allows favorable correction of a variety of aberrations and can be made compatible with a high pixel imaging element having a megapixel or more incorporated in a small mobile product such as a mobile phone, has been obtained.

Embodiment 2

Figure 3:
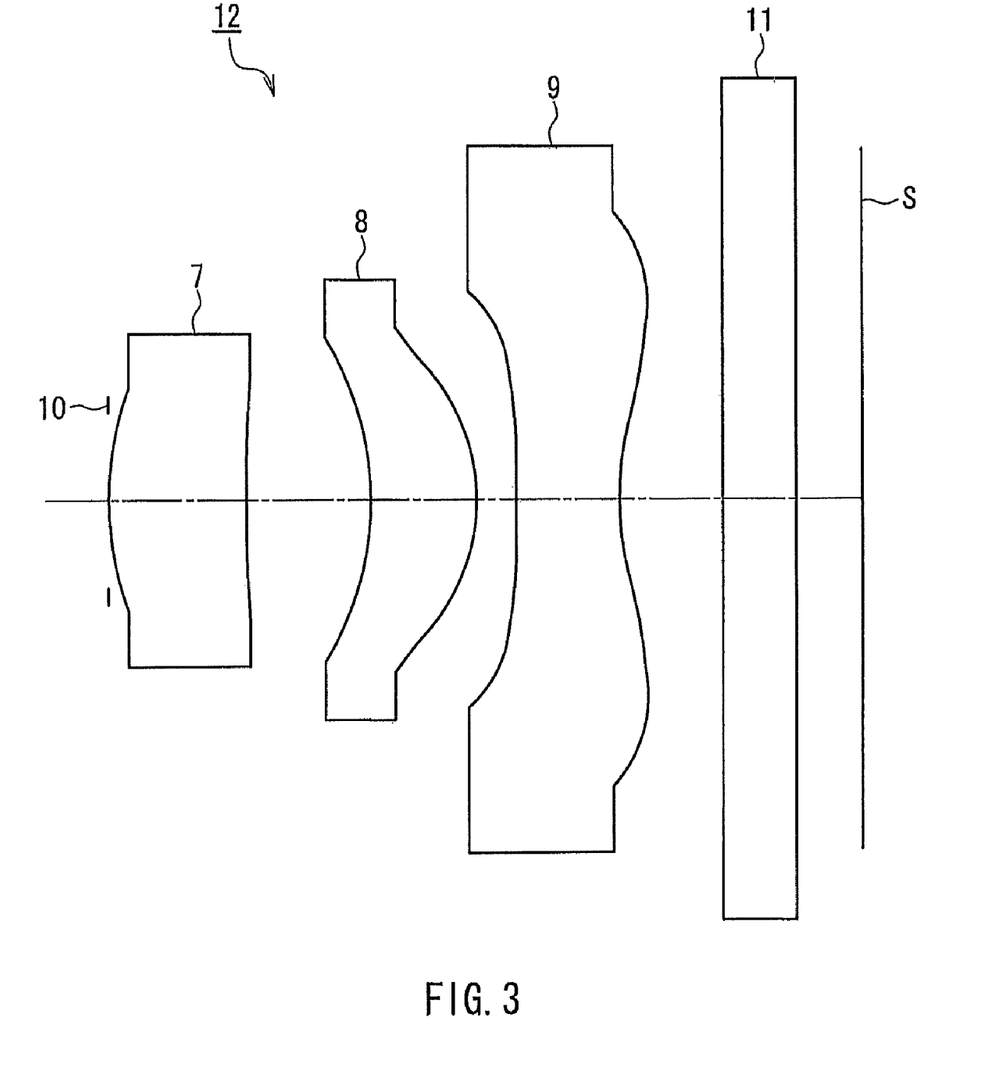
FIG. 3 is a layout showing a configuration of an imaging lens according to Embodiment 2 of the present invention.

FIG. 3 is a layout showing a configuration of an imaging lens according to Embodiment 2 of the present invention.

As shown in FIG. 3, an imaging lens 12 of the present embodiment includes, in order from the object side (left side of FIG. 3) to the image surface side (right side of FIG. 3): an aperture stop 10; a first lens 7 having positive refractive power whose lens surface facing the image surface side is provided with a diffractive optical element; a second lens 8 composed of a meniscus lens having positive refractive power whose lens surface facing the image surface side is convex; and a third lens 9 having negative refractive power.

The first lens 7 is composed of a meniscus lens whose lens surface facing the object side is convex.

The third lens 9 is composed of a biconcave lens.

The imaging lens 12 of the present embodiment also is configured to satisfy the conditional expressions (1) to (4).

For these reasons, also with the configuration of the imaging lens 12 of the present embodiment, effects similar to those achieved by the configuration of the imaging lens 6 of Embodiment 1 can be achieved. That is, according to the configuration of the imaging lens 12 of the present embodiment, it is possible to provide a high-performance imaging lens composed of three lenses that can be made compact (downsized, thinned), allows favorable correction of a variety of aberrations and can be made compatible with a high pixel imaging element having a megapixel or more incorporated in a small mobile product, such as a mobile phone. And according to a configuration of an imaging device using the imaging lens 12 of the present embodiment, it is possible to provide a compact and high-performance imaging device, and by extension a compact and high-performance mobile product, such as a mobile phone, equipped with the imaging device.

A transparent parallel plate 11 similar to the parallel plate 5 in Embodiment 1 is disposed between the third lens 9 and the imaging surface S of the imaging element.

Further, also in the imaging lens 12 of the present embodiment, similarly to the imaging lens 6 of Embodiment 1, the first lens 7 to the third lens 9 are preferably all plastic lenses.

Example 2

Hereinafter, the imaging lens according to the present embodiment will be described in more detail by way of specific examples.

Table 5 provides a specific numerical example of the imaging lens in this example. The imaging lens 12 shown in FIG. 3 is configured on the basis of the data provided in Table 5.

TABLE 5

| Surface number | r (mm) | d (mm) | n | ν |
|---|---|---|---|---|
| Aperture stop | ∞ | 0.00 | — | — |
| First surface | 2.073 | 0.942 | 1.5247 | 56.38 |
| Second surface* | 21.701 | 0.827 | — | — |
| Third surface | −1.985 | 0.725 | 1.5247 | 56.38 |
| Fourth surface | −1.011 | 0.320 | — | — |
| Fifth surface | −51.083 | 0.669 | 1.5247 | 56.38 |
| Sixth surface | 1.397 | 0.671 | — | — |
| Seventh surface | ∞ | 0.500 | 1.5168 | 64.2 |
| Eighth surface | ∞ | 0.05 | — | — |
| Image surface | ∞ | — | — | — |

Further, Tables 6A and 6B provide aspherical coefficients (including conic constant) of the imaging lens in this example.

TABLE 6A

| | κ | A4 | A6 |
|---|---|---|---|
| First surface | −1.949621E+00 | 2.199433E−02 | −1.586409E−03 |
| Second surface* | 0.000000E+00 | 6.322413E−03 | −8.660416E−03 |
| Third surface | −9.911808E+00 | −1.734487E−01 | 1.067155E−01 |
| Fourth surface | −3.044819E+00 | −1.541814E−01 | 9.065980E−02 |
| Fifth surface | 0.000000E+00 | −1.223311E−01 | 4.562393E−02 |
| Sixth surface | −6.934089E+00 | −7.882498E−02 | 2.590810E−02 |

TABLE 6B

| | A8 | A10 | A12 | A14 |
|---|---|---|---|---|
| First surface | −4.225192E−02 | 2.218557E−01 | −3.655427E−01 | 9.339032E−10 |
| Second surface* | −2.927194E−03 | 1.544401E−02 | −5.105961E−03 | −9.832246E−03 |
| Third surface | −3.870900E−02 | 4.599451E−02 | −1.216942E−02 | −2.096685E−03 |
| Fourth surface | −2.655383E−02 | 9.817666E−03 | 3.219268E−03 | −1.057493E−04 |
| Fifth surface | −1.614354E−02 | 3.419072E−03 | −2.393099E−03 | −5.932377E−05 |
| Sixth surface | −7.240304E−03 | 6.116359E−04 | −1.769996E−05 | 1.360768E−06 |

As shown in Tables 6A and 6B, in the imaging lens 12 in this example, the lens surfaces of the first lens 7 to the third lens 9 are all aspherical. It should be noted, however, that the imaging lens 12 is not necessarily limited to this configuration.

In Tables 5, 6A and 6B, the surface marked with an asterisk (second surface: the lens surface of the first lens 7 facing the image surface side) is a diffractive optical element surface. Table 7 provides a specific numerical example of the diffractive optical element surface.

TABLE 7

| Design wavelength | 546.07 nm |
|---|---|
| Diffraction order | 1 |
| C2 | −1.255963E−02 |
| C4 | 1.485998E−03 |

Further, Table 8 provides the F number Fno, the focal length f (mm) of the entire optical system, the optical total length measured in terms of air TL (mm), the maximum image height Y' and the values of the respective conditional expressions (1) to (4) in the imaging lens 12 in this example.

TABLE 8

| Fno | 2.8 |
|---|---|
| f (mm) | 3.58 |
| TL (measured in terms of air) (mm) | 4.70 |
| Y' | 2.24 |
| Conditional expression (1) f1/f | 1.1 |
| Conditional expression (2) f2/f | 0.87 |
| Conditional expression (3) f3/f | −0.72 |
| Conditional expression (4) $f \cdot \phi_{DOE}$ | 0.09 |

Figure 4:
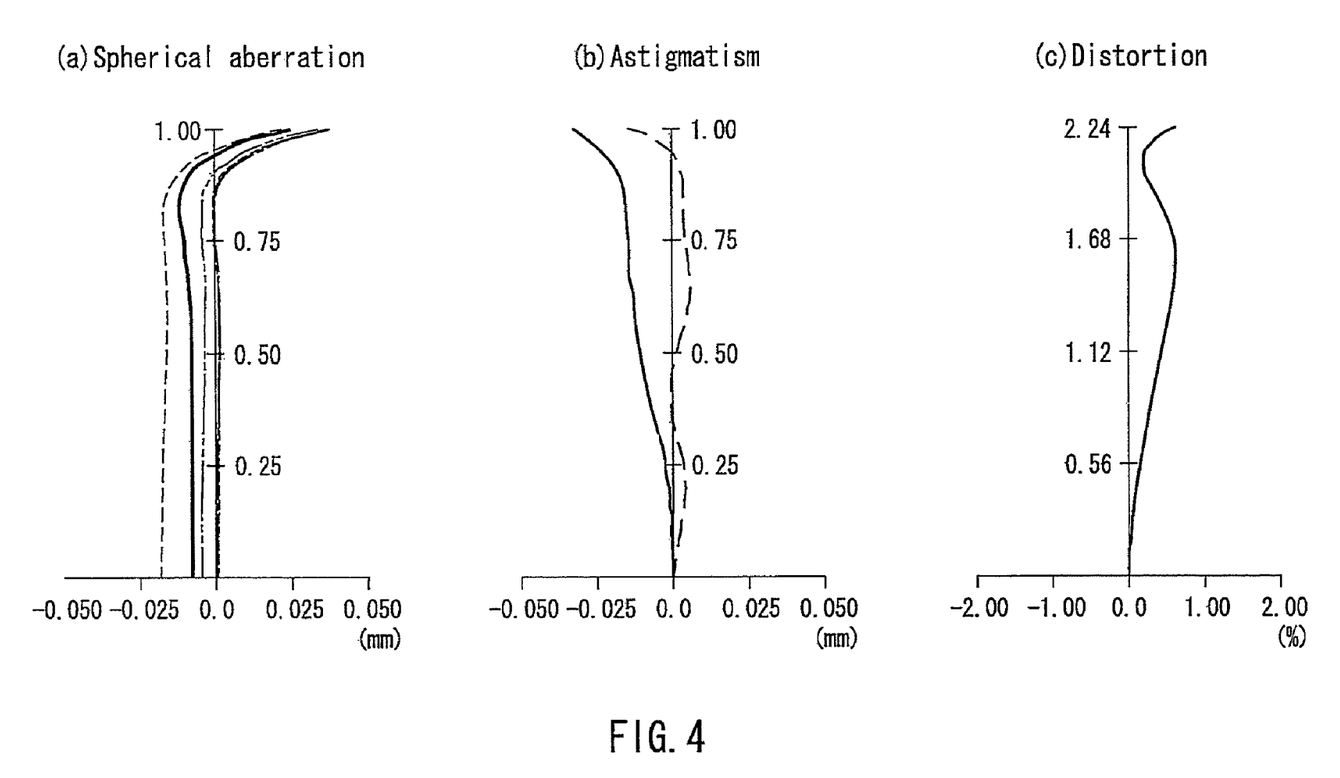
FIG. 4 shows aberration graphs of an imaging lens in Example 2 of the present invention.

FIG. 4 shows aberration graphs of the imaging lens in this example. FIG. 4(a) is a spherical aberration graph. A solid line indicates values at the g line, a short dashed line indicates values at the F line, an alternate long and short dashed line indicates values at the e line, an alternate long and two short dashed line indicates values at the d line, and a long dashed line indicates values at the C line. FIG. 4(b) is an astigmatism graph and a solid line indicates a sagittal field curvature and a dashed line indicates a meridional field curvature. FIG. 4(c) is a distortion graph. A longitudinal chromatic aberration graph is the same as the spherical aberration graph of FIG. 4(a).

As can be seen from the aberration graphs shown in FIG. 4, the imaging lens 12 of this example allows favorable correction of a variety of aberrations, meaning that it is compatible with a high pixel imaging element having a megapixel or more. Additionally, in view of the results provided in Table 8, it is evident that a high-performance imaging lens composed of three lenses, which can be made compact (downsized, thinned), allows favorable correction of a variety of aberrations and can be made compatible with a high pixel imaging element having a megapixel or more incorporated in a small mobile product such as a mobile phone, has been obtained.

Embodiment 3

Figure 5:
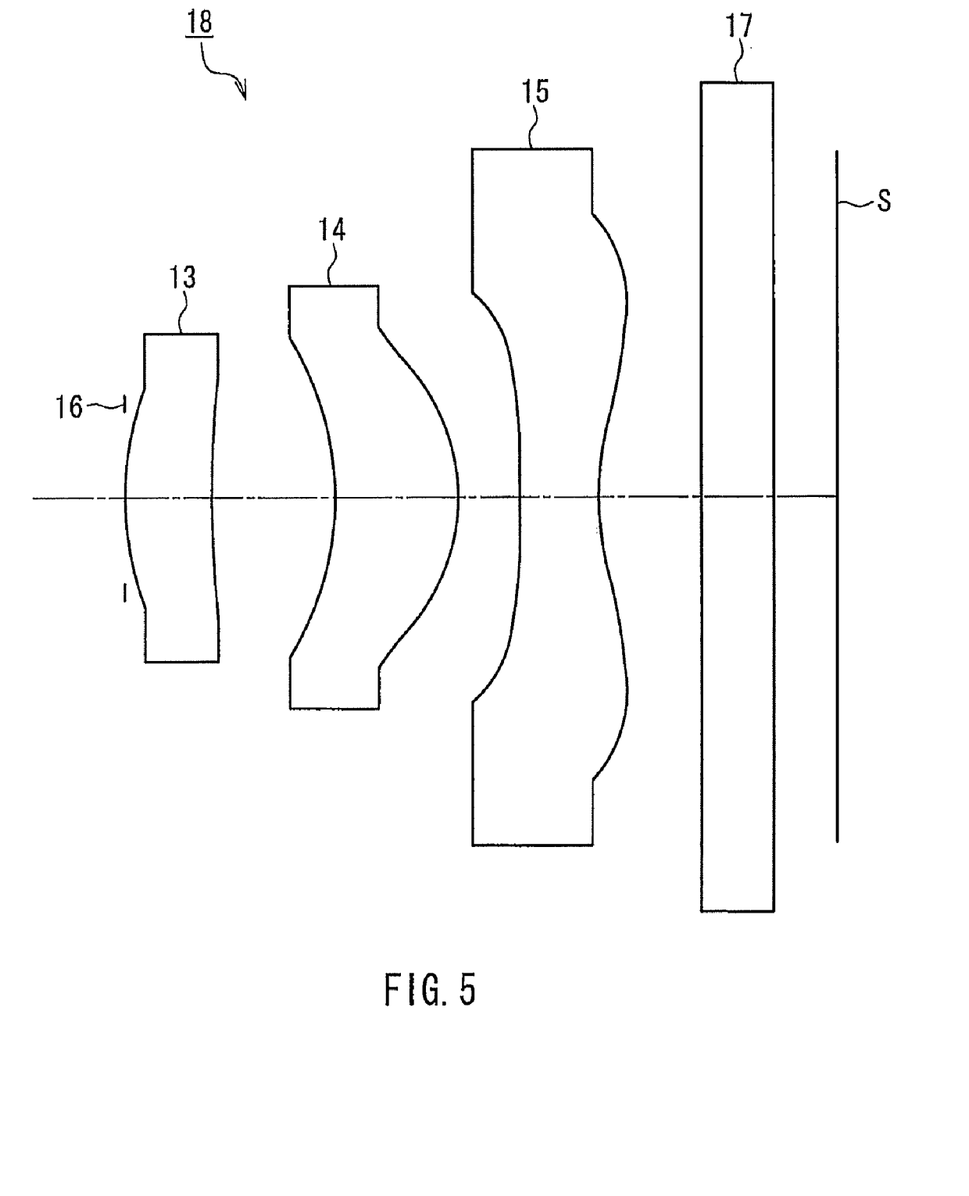
FIG. 5 is a layout showing a configuration of an imaging lens according to Embodiment 3 of the present invention.

FIG. 5 is a layout showing a configuration of an imaging lens according to Embodiment 3 of the present invention.

As shown in FIG. 5, an imaging lens 18 of the present embodiment includes, in order from the object side (left side of FIG. 5) to the image surface side (right side of FIG. 5): an aperture stop 16; a first lens 13 having positive refractive power whose lens surface facing the image surface side is provided with a diffractive optical element; a second lens 14 composed of a meniscus lens having positive refractive power whose lens surface facing the image surface side is convex; and a third lens 15 having negative refractive power.

The first lens 13 is composed of a meniscus lens whose lens surface facing the object side is convex.

The third lens 15 is composed of a biconcave lens.

The imaging lens 18 of the present embodiment also is configured to satisfy the conditional expressions (1) to (4).

For these reasons, also by the configuration of the imaging lens 18 of the present embodiment, effects similar to those achieved by the configuration of the imaging lens 6 of Embodiment 1 can be achieved. That is, according to the configuration of the imaging lens 18 of the present embodiment, it is possible to provide a high-performance imaging lens composed of three lenses that can be made compact (downsized, thinned), allows favorable correction of a variety of aberrations and can be made compatible with a high pixel imaging element having a megapixel or more incorporated in a small mobile product, such as a mobile phone. And according to a configuration of an imaging device using the imaging lens 18 of the present embodiment, it is possible to provide a compact and high-performance imaging device, and by extension a compact and high-performance mobile product, such as a mobile phone, equipped with the imaging device.

A transparent parallel plate 17 similar to the parallel plate 5 in Embodiment 1 is disposed between the third lens 15 and the imaging surface S of the imaging element.

Further, also in the imaging lens 18 of the present embodiment, similarly to the imaging lens 6 of the Embodiment 1, the first lens 13 to the third lens 15 are preferably all plastic lenses.

Example 3

Hereinafter, the imaging lens of the present embodiment will be described in detail by way of specific examples.

Table 9 provides a specific numerical example of the imaging lens in this example. The imaging lens 18 shown in FIG. 5 is configured on the basis of the data provided in Table 9.

TABLE 9

| Surface number | r (mm) | d (mm) | n | ν |
|---|---|---|---|---|
| Aperture stop | ∞ | 0.00 | — | — |
| First surface | 2.058 | 0.621 | 1.5247 | 56.38 |
| Second surface* | 27.566 | 0.800 | — | — |
| Third surface | −2.133 | 0.955 | 1.4956 | 80.8 |
| Fourth surface | −0.899 | 0.380 | — | — |
| Fifth surface | −11.514 | 0.500 | 1.5247 | 56.38 |
| Sixth surface | 1.297 | 0.699 | — | — |
| Seventh surface | ∞ | 0.500 | 1.5168 | 64.2 |
| Eighth surface | ∞ | 0.05 | — | — |
| Image surface | ∞ | — | — | — |

Further, Tables 10A and 10B provide aspherical coefficients (including conic constant) of the imaging lens in this example.

TABLE 10A

| | κ | A4 | A6 |
|---|---|---|---|
| First surface | −2.122768E+00 | 2.435819E−02 | −3.112681E−02 |
| Second surface* | 0.000000E+00 | −1.461138E−03 | −7.546617E−03 |
| Third surface | −6.550496E+00 | −1.336627E−01 | −5.399083E−02 |
| Fourth surface | −2.742506E+00 | −1.415341E−01 | 3.826077E−02 |
| Fifth surface | 0.000000E+00 | −9.918362E−02 | −1.157999E−02 |
| Sixth surface | −7.249928E+00 | −8.835205E−02 | 2.541455E−02 |

TABLE 10B

|  | A8 | A10 |
|---|---|---|
| First surface | 1.385986E−01 | −2.291047E−01 |
| Second surface* | 1.250933E−02 | −4.796094E−03 |
| Third surface | 1.594068E−01 | −4.340404E−02 |
| Fourth surface | −8.188166E−03 | 1.701952E−02 |
| Fifth surface | 3.349103E−02 | −1.331665E−02 |
| Sixth surface | −5.702081E−03 | 3.196399E−04 |

As shown in Tables 10A and 10B, in the imaging lens 18 in this example, the lens surfaces of the first lens 13 to the third lens 15 are all aspherical. It should be noted, however, that the imaging lens 18 is not necessarily limited to this configuration.

In Tables 9, 10A and 10B, the surface marked with an asterisk (second surface: the lens surface of the first lens 13 facing the image surface side) is a diffractive optical element surface. Table 11 provides a specific numerical example of the diffractive optical element surface.

TABLE 11

| Design wavelength | 546.07 nm |
|---|---|
| Diffraction order | 1 |
| C2 | −1.111548E−02 |
| C4 | 1.010550E−03 |

Further, Table 12 provides the F number Fno, the focal length f (mm) of the entire optical system, the optical total length measured in terms of air TL (mm), the maximum image height Y' and the values of the respective conditional expressions (1) to (4) in the imaging lens 18 in this example.

TABLE 12

| Fno | 3.2 |
|---|---|
| f (mm) | 3.4 |
| TL (measured in terms of air) (mm) | 4.50 |
| Y' | 2.24 |
| Conditional expression (1) f1/f | 1.14 |
| Conditional expression (2) f2/f | 0.73 |
| Conditional expression (3) f3/f | −0.64 |
| Conditional expression (4) f · $\phi_{DOE}$ | 0.08 |

Figure 6:
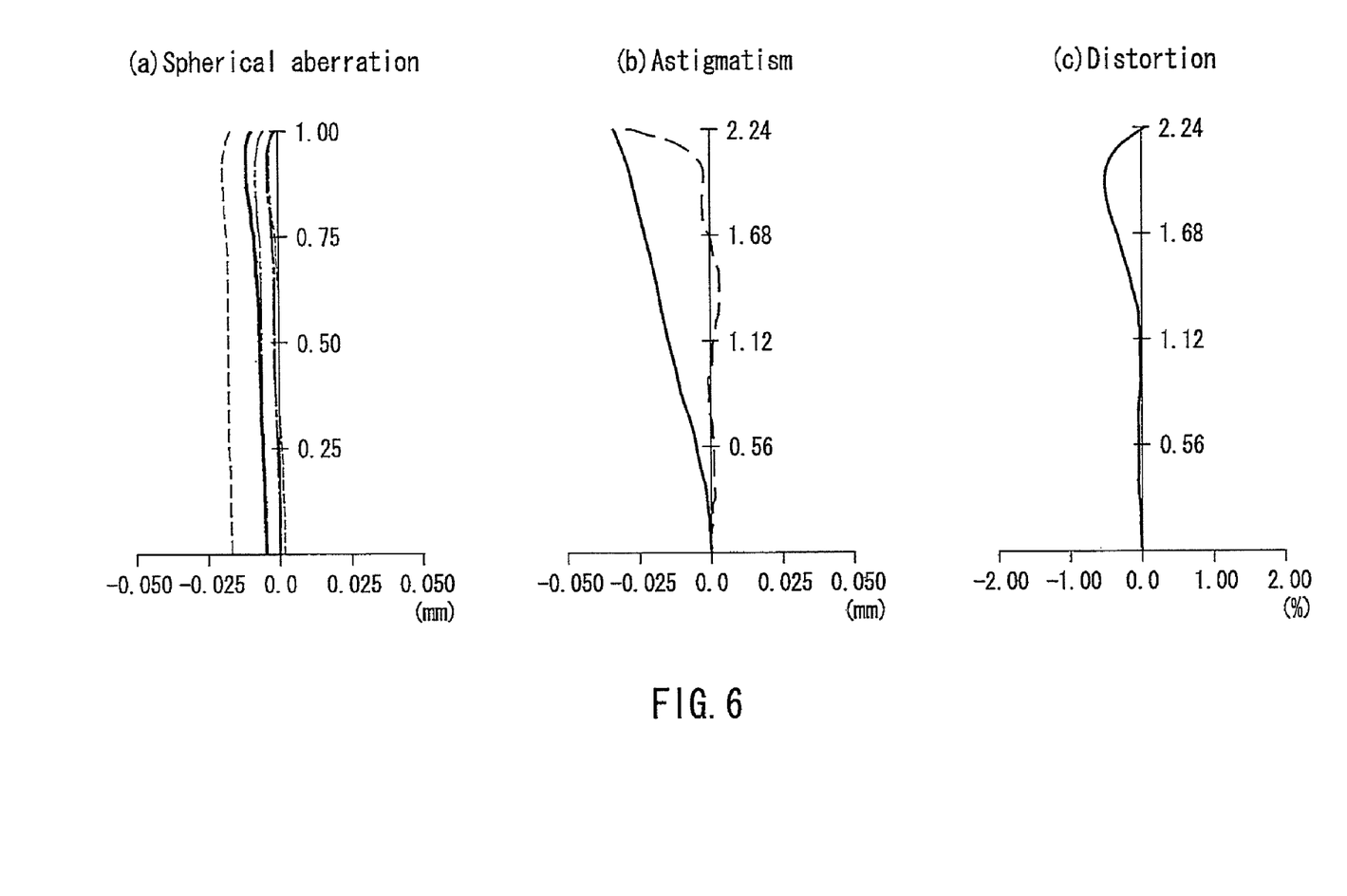
FIG. 6 shows aberration graphs of an imaging lens in Example 3 of the present invention.

FIG. 6 shows aberration graphs of the imaging lens in this example. FIG. 6(*a*) is a spherical aberration graph. A solid line indicates values at the g line, a short dashed line indicates values at the F line, an alternate long and short dashed line indicates values at the e line, an alternate long and two short dashed line indicates values at the d line, and a long dashed line indicates values at the C line. FIG. 6(*b*) is an astigmatism graph and a solid line indicates a sagittal field curvature and a dashed line indicates a meridional field curvature. FIG. 6(*c*) is a distortion graph. A longitudinal chromatic aberration graph is the same as the spherical aberration graph of FIG. 6(*a*).

As can be seen from the aberration graphs shown in FIG. 6, the imaging lens 18 of this example allows favorable correction of a variety of aberrations, meaning that it is compatible with a high pixel imaging element having a megapixel or more. Additionally, in view of the results provided in Table 12, it is evident that a high-performance imaging lens composed of three lenses, which can be made compact (downsized, thinned), allows favorable correction of a variety of aberrations and can be made compatible with a high pixel imaging element having a megapixel or more incorporated in a small mobile product such as a mobile phone, has been obtained.

INDUSTRIAL APPLICABILITY

Since the imaging lens of the present invention can be made compact (downsized, thinned), allows a reduction in cost and can be made compatible with a high pixel imaging element having a megapixel or more, it is particularly useful in the field of small mobile products, such as a mobile phone, equipped with an imagining element for which an increase in the number of pixels is desired.

DESCRIPTION OF REFERENCE NUMERALS

1, 7, 13 first lens
2, 8, 14 second lens
3, 9, 15 third lens
4, 10, 16 aperture stop
5, 11, 17 parallel plate
6, 12, 18 imaging lens
S imaging surface

The invention claimed is:

1. An imaging lens consisting of, in order from the object side to the image side: a first lens having positive refractive power with a diffractive optical element provided on a surface facing an image side; a second lens having a meniscus shape with positive refractive power and a convex surface facing an image side; and a third lens having negative refractive power, wherein the imaging lens satisfies all of the following conditional expressions (1) to (4):

$$0.9 < f1/f < 1.3 \quad (1)$$

$$0.7 < f2/f < 1.1 \quad (2)$$

$$-0.8 < f3/f - 0.6 \quad (3)$$

$$-0.3 < f \cdot \phi_{DOE} < 0.5 \quad (4)$$

where f denotes a focal length of the imaging lens, f1 denotes a focal length of the first lens, f2 denotes a focal length of the second lens, f3 denotes a focal length of the third lens and $\phi_{DOE}$ denotes refractive power of the diffractive optical element.

2. The imaging lens according to claim 1, wherein the first lens to the third lens are all plastic lenses.

3. An imaging device comprising:
an imaging element for converting an optical signal corresponding to an object to an image signal and outputting the image signal; and
an imaging lens for forming an image of the object onto an imaging surface of the imaging element,
wherein the imaging lens according to claim 1 is used as the imaging lens.

* * * * *